United States Patent
Penzias et al.

(10) Patent No.: US 7,478,247 B2
(45) Date of Patent: Jan. 13, 2009

(54) METHODS AND SYSTEMS FOR SECURING DATA PROCESSING DEVICES

(75) Inventors: Arno Penzias, San Francisco, CA (US); Charles W. K. Gritton, Sterling, VA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 63 days.

(21) Appl. No.: 11/271,618

(22) Filed: Nov. 10, 2005

(65) Prior Publication Data

US 2006/0130013 A1 Jun. 15, 2006

Related U.S. Application Data

(60) Provisional application No. 60/626,590, filed on Nov. 10, 2004.

(51) Int. Cl.
*G06F 12/14* (2006.01)
*H04L 9/00* (2006.01)
(52) U.S. Cl. .................. 713/189; 713/168; 713/193
(58) Field of Classification Search .................. 713/189
See application file for complete search history.

(56) References Cited

U.S. PATENT DOCUMENTS

| | | | |
|---|---|---|---|
| 6,096,004 A * | 8/2000 | Meglan et al. ............ 604/95.01 |
| 6,141,756 A * | 10/2000 | Bright et al. .................. 726/22 |
| 6,411,941 B1 * | 6/2002 | Mullor et al. ................. 705/59 |
| 6,523,119 B2 | 2/2003 | Pavlin et al. |
| 6,671,808 B1 | 12/2003 | Abbott et al. |
| 6,681,326 B2 * | 1/2004 | Son et al. .................... 713/150 |
| 6,683,954 B1 | 1/2004 | Searle |
| 6,745,138 B2 | 6/2004 | Przydatek et al. |
| 6,785,825 B2 | 8/2004 | Colvin |
| 6,857,067 B2 | 2/2005 | Edelman |
| 6,874,092 B1 | 3/2005 | Motoyama et al. |
| 6,898,286 B2 | 5/2005 | Murray |
| 6,904,527 B1 | 6/2005 | Parlour et al. |
| 7,051,211 B1 * | 5/2006 | Matyas et al. ............... 713/187 |
| 7,130,426 B1 * | 10/2006 | Cha et al. .................... 380/201 |
| 2002/0007347 A1 * | 1/2002 | Blumenthal et al. ........... 705/51 |
| 2005/0071656 A1 * | 3/2005 | Klein et al. ................. 713/193 |

* cited by examiner

*Primary Examiner*—Kaveh Abrishamkar
(74) *Attorney, Agent, or Firm*—Potomac Patent Group PLLC

(57) ABSTRACT

Methods and systems for improving the security of devices to prevent unauthorized access to designs and software code are described.

15 Claims, 3 Drawing Sheets

METHODS AND SYSTEMS FOR SECURING DATA PROCESSING DEVICES

RELATED APPLICATIONS

This application is related to, and claims priority from, U.S. Provisional Patent Application Ser. No. 60/626,590, filed on Nov. 10, 2004 and entitled "Methods and Systems for Securing Data Processing Devices", the disclosure of which is incorporated here by reference.

BACKGROUND

The present invention relates, generally, to techniques and systems for protecting designs and programs against reverse engineering and piracy and, more specifically, to methods and systems for preventing copying and cloning of such designs and programs.

Most designs include software that is protected electronically. A typical example is using a security bit to make reading code from a Flash ROM part in a microcontroller inaccessible to outside parts. The problem with this type of protection is that a common technique of parties trying to reverse engineer or copy the design is to pry open or file away the cover of the part and either dynamically or statically read out the memory contents. Accordingly, while the security bit provides protection against less rigorous reverse engineering techniques, it is not effective against a more determined pirate.

Accordingly, there continues to be a need for improving the security of such devices to prevent unauthorized access to designs and software code.

SUMMARY

Systems and methods according to the present invention address this need and others by providing techniques for improving the security of devices to prevent unauthorized access to designs and software code. According to one exemplary embodiment, a method for operating a device includes the steps of storing an encrypted program in a non-volatile memory, obtaining, by a first processor, a decryption key from a second processor, decrypting a program and storing the decrypted program in a volatile memory, and executing the program from the volatile memory.

According to another exemplary embodiment, a processing device includes a non-volatile memory storing an encrypted program, a first processor for obtaining a decryption key and decrypting a program, and a volatile memory for storing a decrypted program, wherein the processor executes the program from the volatile memory.

According to yet another exemplary embodiment, a device includes a means for storing an encrypted program in a non-volatile memory, a means for obtaining, by a first processor, a decryption key from a second processor, a means for decrypting a program and storing the decrypted program in a volatile memory and a means for executing the program from the volatile memory.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
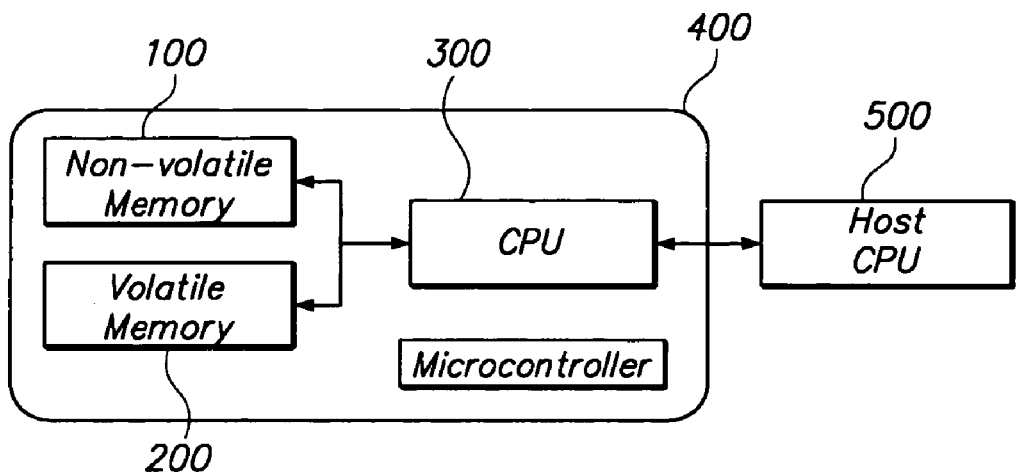
FIG. 1 depicts an exemplary processing system according to an exemplary embodiment of the present invention.

In order to provide some context for this discussion, an exemplary processing system in which the present invention can be implemented will first be described with respect to FIG. 1. Those skilled in the art will appreciate, however, that the present invention is not restricted to implementation in this type of system and that more or fewer components can be included therein. Therein, the system includes a non-volatile memory 100, a volatile memory 200, a CPU 300, a microcontroller package 400, and a host computer 500. A power supply (not shown) is also present within microcontroller package 400. The non-volatile memory 100 retains its information even if power is removed from it. In contrast, the volatile memory 200 loses all information if power is removed.

According to one exemplary embodiment of the present invention, operation of the unit is as follows. According to this exemplary embodiment, the non-volatile memory 100, the volatile memory 200 and the CPU 300 are all contained in a single microcontroller package 400. An encrypted program which describes how the device should operate is stored in non-volatile memory 100. The volatile memory 200 is empty. Referring to the flow chart of FIG. 2, the first step 600 is that the CPU 300 obtains a decryption key from the host computer 500. The decryption key is based, for example, on an identifier related to the device, e.g., serial number of the microcontroller 400, and on the time of the request. Alternatively, other data can be used in addition to, or instead of, an identifier related to the device and time of request to generate the decryption key. This is done so that, in general, the same decryption key does not work more than once. Next, at step 602, the encrypted program information is retrieved from the non-volatile memory 100 and decrypted into the volatile memory 200 by CPU 300. Simultaneously with step 602 or subsequent thereto, the encrypted program stored in non-volatile memory 100 can optionally be modified (e.g., re-encrypted) so that the key required to decrypt it next time is different (step 604). The program then runs out of the volatile memory 200.

In this exemplary embodiment, the decrypted program is never stored in the non-volatile memory 100 where it can be accessed by, for example, a pirate who pries open the cover of microcontroller package 400. The decrypted program only appears in the volatile memory 200 and does so only after a successful information session was established with the host computer 500. Accordingly, a pirate will need to turn off power to the device in order to access the memory devices 100 and 200 inside of the microcontroller 400. In the process, the decrypted information stored in volatile memory 200 will be lost. To dissuade those pirates who try to pry open the cover with power on, a mechanical linkage (not shown) can be provided which makes it difficult or impossible to remove the cover to the microcontroller package 400 without severing the power connection to the volatile memory 200. An example of a mechanical linkage is found in U.S. Pat. No. 6,874,092 B1 published on Mar. 29, 2005, entitled "Methods and Apparatus for Erasing Data After Tampering", the disclosure of which is incorporated here by reference. In the aforementioned patent, sensors are monitored by a processing unit via a linkage to detect tampering with a storage unit, which then allows overwriting of data in the storage unit. According to an exemplary embodiment, when the sensor(s) (not shown) detect unauthorized opening of the microcontroller package 400 a signal is sent through a linkage (not shown) disabling power to the device which erases all information in volatile memory 200. Those skilled in the art will appreciate, however, that other mechanisms for connecting an unauthorized opening of the microcontroller package 400 to disabling the power supply can be used instead of that described in the aforementioned patent.

Figure 2:
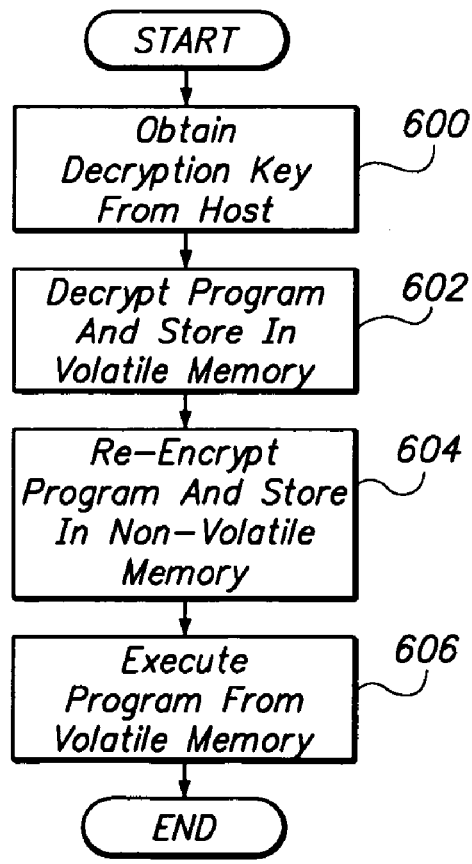
FIG. 2 depicts a method for activating a program according to an exemplary embodiment of the present invention.
Figure 3:
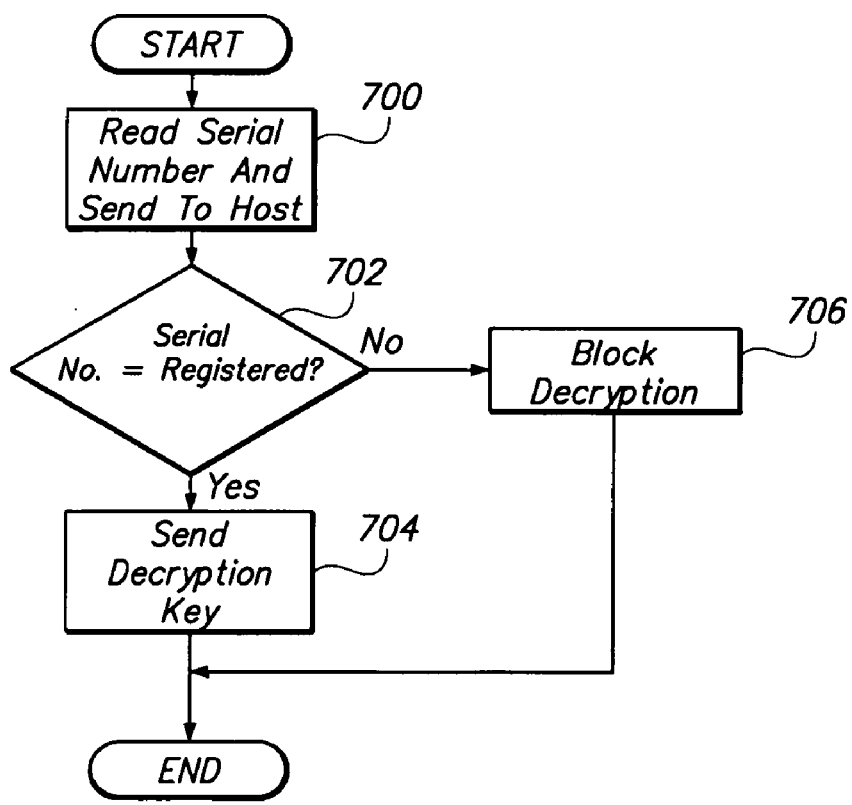
FIG. 3 depicts a method of obtaining a decryption key according to an exemplary embodiment of the present invention.
Figure 4:
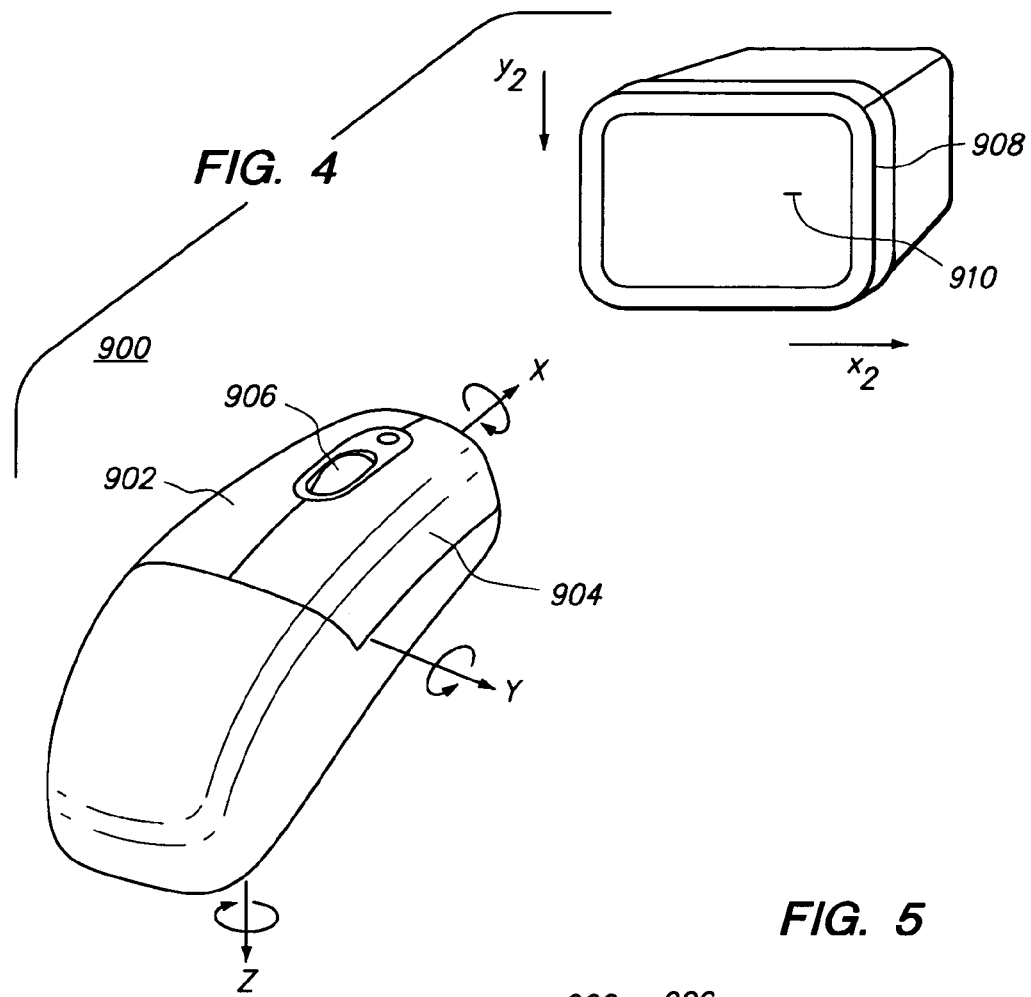
FIG. 4 shows a three-dimensional (hereinafter "3D") pointing device according to an exemplary embodiment of the present invention.

Another potential attack on the program code by a determined pirate would involve reading the flash memory from a powered down device and then running it from a different device where the pirate has easier access. An example would be to run the software from within an emulator program. In this case, step 600 in FIG. 2 provides significant protection, which step is expanded upon in the flowchart of FIG. 3. Therein, the CPU 300 reads, for example, a hard programmed serial number from the circuit board on which elements 100, 200 and 300 are connected and sends it to the host computer 500. The host computer 500 can check to make sure that the serial number was not previously registered and, if so, permits the code to be decrypted by sending the decryption key at step 704. If the serial number was already registered, however, the decryption is blocked as being potential piracy at step 706. In this case, should a pirate obtain the decrypted program by itself, such data is not entirely useful because it requires a particular serial number on the printed circuit board. Cloning the program requires cloning the serial number in addition to the program thus making piracy that much more difficult.

The foregoing exemplary embodiment can be extended to permit multiple, legitimate executions of the program stored by microcontroller 400. For example, one option is to identify the IP address of the CPU 300 making the initial request and associate the IP address with the serial number, or other identifier related to the device. Then, for subsequent requests, host 500 can refuse to issue a decryption key if the requesting entity has an IP address which does not match the one it has previously stored in association with a particular serial number. Another option is to assume that the full protocol involves a sign-in and sign-off phase. The sign-off phase explicitly releases the serial number for another use later. If the CPU 300 crashes or otherwise fails to sign-off, the user can be forced to wait for a predetermined time period, e.g., a day, for the item to clear, i.e., the host computer 500 will not issue another decryption key for a day if the previous session was not properly logged out. In this case, even if the pirate is able to use the stolen program code, the re-use period can be made to be too long to be commercially attractive.

Various alternatives are also contemplated by the present invention. For example, in some exemplary embodiments, the entire program is stored in a single non-volatile memory 200, and a microcontroller 400, including the elements 100, 200 and 300 is described as being in a single package. However, these elements can be contained in a number of different packages. For example, the program and memories could be distributed across a number of different devices as long as the non-volatile RAM(s) are difficult to access without mechanically opening a package or otherwise triggering a mechanism that removes power from that memory device. In addition, the serial number of the board can be designed to be difficult to reverse engineer at reasonable cost.

Figure 5:
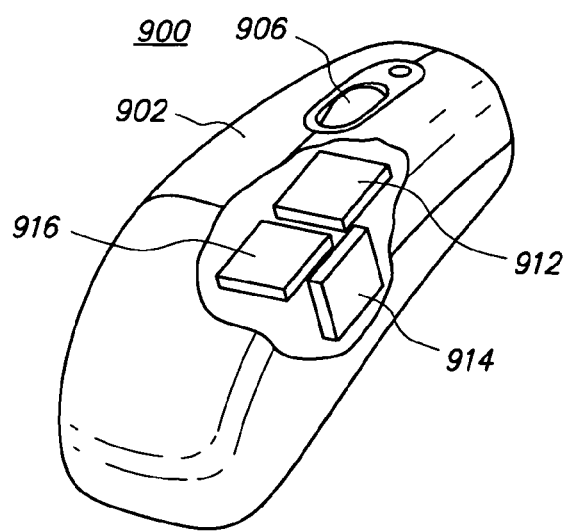
FIG. 5 illustrates a cutaway view of the 3D pointing device in FIG. 4 including two rotational sensors and one accelerometer.

The above-described exemplary embodiments can be used in a variety of applications such as input devices that interact with media systems. These devices can be 3D pointers as described, for example, in U.S. Provisional patent application Ser. No. 11/119,683, filed on May 2, 2005 entitled "3D Pointing Devices and Methods", the disclosure of which is incorporated here by reference. Such handheld devices enable the translation of movement, e.g., gestures, into commands to a user interface. An exemplary 3D pointing device 900 is depicted in FIG. 5. Therein, user movement of the 3D pointing can be defined, for example, in terms of a combination of x-axis attitude (roll), y-axis elevation (pitch) and/or z-axis heading (yaw) motion of the 3D pointing device 900. In addition, some exemplary embodiments of the present invention can also measure linear movement of the 3D pointing device 900 along the x, y, and z axes to generate cursor movement or other user interface commands. In the exemplary embodiment of FIG. 5, the 3D pointing device 900 includes two buttons 902 and 904 as well as a scroll wheel 906, although other exemplary embodiments will include other physical configurations.

According to exemplary embodiments of the present invention, it is anticipated that 3D pointing devices 900 will be held by a user in front of a display 908 and that motion of the 3D pointing device 900 will be translated by the 3D pointing device into output which is usable to interact with the information displayed on display 908, e.g., to move the cursor 910 on the display 908. For example, rotation of the 3D pointing device 900 about the y-axis can be sensed by the 3D pointing device 900 and translated into an output usable by the system to move cursor 910 along the $y_2$ axis of the display 908. Likewise, rotation of the 3D pointing device 908 about the z-axis can be sensed by the 3D pointing device 900 and translated into an output usable by the system to move cursor 910 along the $x_2$ axis of the display 908. It will be appreciated that the output of 3D pointing device 900 can be used to interact with the display 908 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 900 sensed about the x-axis of 3D pointing device 900 can be used in addition to, or as an alternative to, y-axis and/or z-axis rotation to provide input to a user interface.

One challenge faced in implementing exemplary 3D pointing devices 900 is to employ components, e.g., rotational sensors 912 and 914, which are not too costly, while at the same time providing a high degree of correlation between movement of the 3D pointing device 900, a user's expectation regarding how the user interface will react to that particular movement of the 3D pointing device and actual user interface performance in response to that movement. For example, if the 3D pointing device 900 is not moving, the user will likely expect that the cursor ought not to be drifting across the screen. Likewise, if the user rotates the 3D pointing device 900 purely around the y-axis, she or he would likely not expect to see the resulting cursor movement on display 908 contain any significant $x_2$ axis component. To achieve these, and other, aspects of exemplary embodiments of the present invention, various measurements and calculations are performed by the handheld device 900 which are used to adjust the outputs of one or more of the sensors 912, 914 and 916 and/or as part of the input used by a processor to determine an appropriate output for the user interface based on the outputs of the sensors 912, 914 and 916. The program for this inertial movement processing function can be stored in non-volatile memory 200 and be executed according to aforementioned exemplary embodiments of the present invention. Additional examples of programs in a handheld device protected according to exemplary embodiments of the present invention could be programs which perform a tremor reduction function, or a tremor classification system. An example of a tremor classification system which can be programmed into a non-volatile memory 200 in an input device is found in U.S. patent application Ser. No. 11/119,688 filed May 2, 2005, entitled "Methods and Devices for Identifying Users Based on Tremors", the disclosure of which is incorporated here by reference.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for operating an input device comprising the steps of:
    storing an encrypted program in a non-volatile memory, wherein said encrypted program in non-volatile memory is one of a program controlling an inertial movement function, a program controlling a tremor reduction function, or a program describing a tremor classification system;
    obtaining, by a first processor, a decryption key from a second processor, wherein said step of obtaining further comprises the steps of:
        sending an identifier associated with said first processor to said second processor;
        verifying, by said second processor, accessibility to said program for said first processor based on said identifier; and
        selectively transmitting said decryption key to said first processor based on a result of said verifying step;
    decrypting said program and storing said decrypted program in a volatile memory;
    executing said program from said volatile memory;
    re-encrypting said program and re-storing said program in said non-volatile memory; and
    requiring a new decryption key for accessing said re-encrypted program.

2. The method of claim 1, wherein said identifier is an Internet Protocol address.

3. The method of claim 1, wherein said encrypted program in non-volatile memory is said program controlling an inertial movement function.

4. The method of claim 1, wherein said encrypted program in non-volatile memory is said program controlling a tremor reduction function.

5. The method of claim 1, wherein said encrypted program in non-volatile memory is said program describing a tremor classification system.

6. A device comprising:
    an encrypted program stored in a non-volatile memory, wherein said encrypted program in non-volatile memory is one of a program controlling an inertial movement function, a program controlling a tremor reduction function, or a program describing a tremor classification system;
    a first processor obtaining a decryption key from a second processor, wherein said step of obtaining further comprises the steps of:
        sending an identifier associated with said first processor to said second processor;
        verifying, by said second processor, accessibility to said program for said first processor based on said identifier; and
        selectively transmitting said decryption key to said first processor based on a result of said verifying step;
    wherein said program is decrypted and stored in a volatile memory, said program is executed from said volatile memory, re-encrypted and restored in said non-volatile memory; and
    a new decryption key for accessing said re-encrypted program.

7. The device of claim 6, wherein said identifier is an Internet Protocol address.

8. The device of claim 6, wherein said encrypted program in non-volatile memory is said program controlling an inertial movement function.

9. The device of claim 6, wherein said encrypted program in non-volatile memory is said program controlling a tremor reduction function.

10. The device of claim 6, wherein said encrypted program in non-volatile memory is said program describing a tremor classification system.

11. A computer-readable medium containing instructions which, when executed on a computer, perform the steps of:
    storing an encrypted program in a non-volatile memory, wherein said encrypted program in non-volatile memory is one of a program controlling an inertial movement function, a program controlling a tremor reduction function, or a program describing a tremor classification system;
    obtaining, by a first processor, a decryption key from a second processor, wherein said step of obtaining further comprises the steps of:
        sending an identifier associated with said first processor to said second processor;
        verifying, by said second processor, accessibility to said program for said first processor based on said identifier; and
        selectively transmitting said decryption key to said first processor based on a result of said verifying step;
    decrypting said program and storing said decrypted program in a volatile memory;
    executing said program from said volatile memory;
    re-encrypting said program and re-storing said program in said non-volatile memory; and
    requiring a new decryption key for accessing said re-encrypted program.

12. The computer-readable medium of claim 11, wherein said identifier is an Internet Protocol address.

13. The computer-readable medium of claim 11, wherein said encrypted program in non-volatile memory is said program controlling an inertial movement function.

14. The computer-readable medium of claim 11, wherein said encrypted program in non-volatile memory is said program controlling a tremor reduction function.

15. The computer-readable medium of claim 11, wherein said encrypted program in non-volatile memory is said program describing a tremor classification system.

* * * * *